United States Patent
Turbin et al.

(10) Patent No.: US 11,188,644 B2
(45) Date of Patent: Nov. 30, 2021

(54) APPLICATION BEHAVIOUR CONTROL

(71) Applicant: F-Secure Corporation, Helsinki (FI)

(72) Inventors: Pavel Turbin, Espoo (FI); Dmitrii Tikhonov, Espoo (FI); Grigori Eskov, Espoo (FI); Janne Laaksonen, Espoo (FI)

(73) Assignee: F-Secure Corporation, Helsinki (FI)

( * ) Notice: Subject to any disclaimer, the term of this patent is extended or adjusted under 35 U.S.C. 154(b) by 258 days.

(21) Appl. No.: 16/356,555

(22) Filed: Mar. 18, 2019

(65) Prior Publication Data

US 2019/0294787 A1    Sep. 26, 2019

(30) Foreign Application Priority Data

Mar. 20, 2018 (GB) ..................................... 1804421

(51) Int. Cl.
| | |
|---|---|
| *G06F 21/55* | (2013.01) |
| *G06F 21/53* | (2013.01) |
| *G06F 21/56* | (2013.01) |

(52) U.S. Cl.
CPC ............ *G06F 21/554* (2013.01); *G06F 21/53* (2013.01); *G06F 21/562* (2013.01); *G06F 21/568* (2013.01); *G06F 2221/033* (2013.01)

(58) Field of Classification Search
CPC ...... G06F 21/554; G06F 21/53; G06F 21/562; G06F 21/568; G06F 2221/033; H04L 63/1433
See application file for complete search history.

(56) References Cited

U.S. PATENT DOCUMENTS

| | | | | |
|---|---|---|---|---|
| 10,462,173 | B1* | 10/2019 | Aziz | G06F 21/56 |
| 2008/0066179 | A1 | 3/2008 | Liu | 726/24 |
| 2012/0233165 | A1* | 9/2012 | Kirkpatrick | G06F 8/77 707/737 |
| 2016/0078347 | A1 | 3/2016 | Salajegheh et al. | |
| 2016/0378989 | A1* | 12/2016 | Park | G06F 21/568 726/23 |

* cited by examiner

*Primary Examiner* — Paul E Callahan
(74) *Attorney, Agent, or Firm* — Harrington & Smith

(57) ABSTRACT

There is provided a method for application behaviour control on a computer system. The method includes grouping applications into a set of clusters, wherein each application is grouped to a specific cluster on the basis of predefined event profiles for applications in the specific cluster; monitoring procedures that a specific cluster performs on one or more computer devices; and generating a list of expected events and prohibited events of the specific cluster based on monitoring for enabling the one or more client computer devices and/or an administrator of the one or more client computer devices to take further action related to the applications installed on the one or more client computer devices.

21 Claims, 3 Drawing Sheets

---

S101 Grouping applications into set of clusters on basis of predefined event profiles identifying procedures known to be performed by the applications S102 Monitoring procedures that a specific cluster performs on one or more computer devices S103 Generating list of expected events and prohibited events of specific cluster based on the monitoring for enabling client computer devices and/or an administrator of the one or more client computer devices to take further action related to the applications installed

APPLICATION BEHAVIOUR CONTROL

FIELD OF THE INVENTION

The present invention relates to the improving security of a computer system using a behavioural analysis approach.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, iOS™, Windows Mobile™, and Blackberry OS™.

A computer system will generally run a number of applications. Security applications are often configured to identify malicious applications, for example by comparison of an application installed on the computer system with a database of known applications. Once identified, the known malicious applications can be excluded from some operations of the security application to free up resources on the computer system.

Malware often attempts to pass itself off as a benign application—for example, a malicious file may be a modified version of a benign file, or contain aspects of a benign file which are known to be checked by security applications. As an alternative, a malware attack may modify a benign application in order to add instructions to the application itself, causing it to execute the malicious code when run.

Several techniques, such as those used in F-Secure's DeepGuard™ technology, exist to detect code injection or modifications to files as they occur. However, once the code has been inserted into a file, or a malicious file has been created which can pass itself off as a legitimate application, it is more challenging to detect the malicious code.

Application control is one example of a process that is used to help a computer system administrator to add extra layer of security. Administrator defines security policies restricting end point applications from performing certain operations, for instance blocking specific applications from installing a driver. Application control may be a part of general end point protection including anti-virus, firewall and other security solutions. To perform protection, clients have low level tools such as file filter drivers, process monitors and other tools. Client computers work in cooperation with backend computers where different meta data about actual files and decisions on how to handle them are stored.

Configuring application control or other corresponding security processes is untrivial task. Too restrictive security policies hurt usability or can even lock the whole system and laxed policies reduce security value of application control. Finding balance requires deep knowledge of application behaviour and its usage pattern from the system administrator.

Thus, there is a need for enhanced processes to define application restriction policies and also enabling moving at least part of the decision logic from end point administrator to a central backend where decisions are better controlled.

SUMMARY

Various aspects of examples of the invention are set out in the claims.

According to an aspect of the invention, there is provided a method of application behaviour control as specified in claims 1 and 11.

According to an aspect of the invention, there is provided a computer system as specified in claim 19.

According to an aspect of the invention, there is provided a server as specified in claim 20.

According to an aspect of the invention, there is provided a computer system as specified in the claims.

According to an aspect of the invention, there is provided a server as specified in the claims.

Further embodiments of the invention are defined in the dependent claims.

DETAILED DESCRIPTION

The embodiments of the invention aim to solve the issues discussed earlier by providing an application control solution where applications are grouped into clusters, wherein each cluster covers multiple versions of same application from its continuous development or joining of similar applications. For example all text processors may be grouped into a same cluster. Next, various events that a cluster performs are monitored. An event may be a specific operation such as downloading a file from a remote computer or launching a local process. Each cluster thus has its own set of specific events depending on applications grouped into the cluster. For example, text processors may create and modify user documents but never launch a new process.

On end points/client devices the installed applications are matched to these known clusters and a list of the set of specific events of a cluster (e.g. performed and never performed events) may be obtained from the backend. The endpoint application control/security application/other tool may use the list to determine which events are allowed and which are not. For example, usual events of the group of applications may be allowed and never performed events may be blocked. In an embodiment, endpoint application control may also provide reporting service to administrator as part of application inventory. The reporting service may describe application functionality and thus help administrator in understanding the risks of running specific applications.

In an embodiment, the method may also be used to enable enhanced application inventory. An administrator may be presented a list of applications that are installed on an endpoint and the expected functionality of these applications. Thus, it is possible to identify possible risks of having these applications installed. For example, once an endpoint computer is known to have an ftp file server and it is able to share local files with an external or a host has a peer to peer exchange software potentially unwanted in an organization, the administrator may be informed about the risks involved. This information may then be used by the administrator to uninstall the risky applications for example. In an embodiment, a list of expected events of applications from different end points is generated and an integrated view of the events in a company domain is provided to the administrator. The events may be grouped and sorted based on risk level: higher level meaning more risk to compromise system security, for example. The administrator may thus make decisions based on the ratings, such as forcing uninstallation, adding blocking policies for application control, etc.

Figure 1:
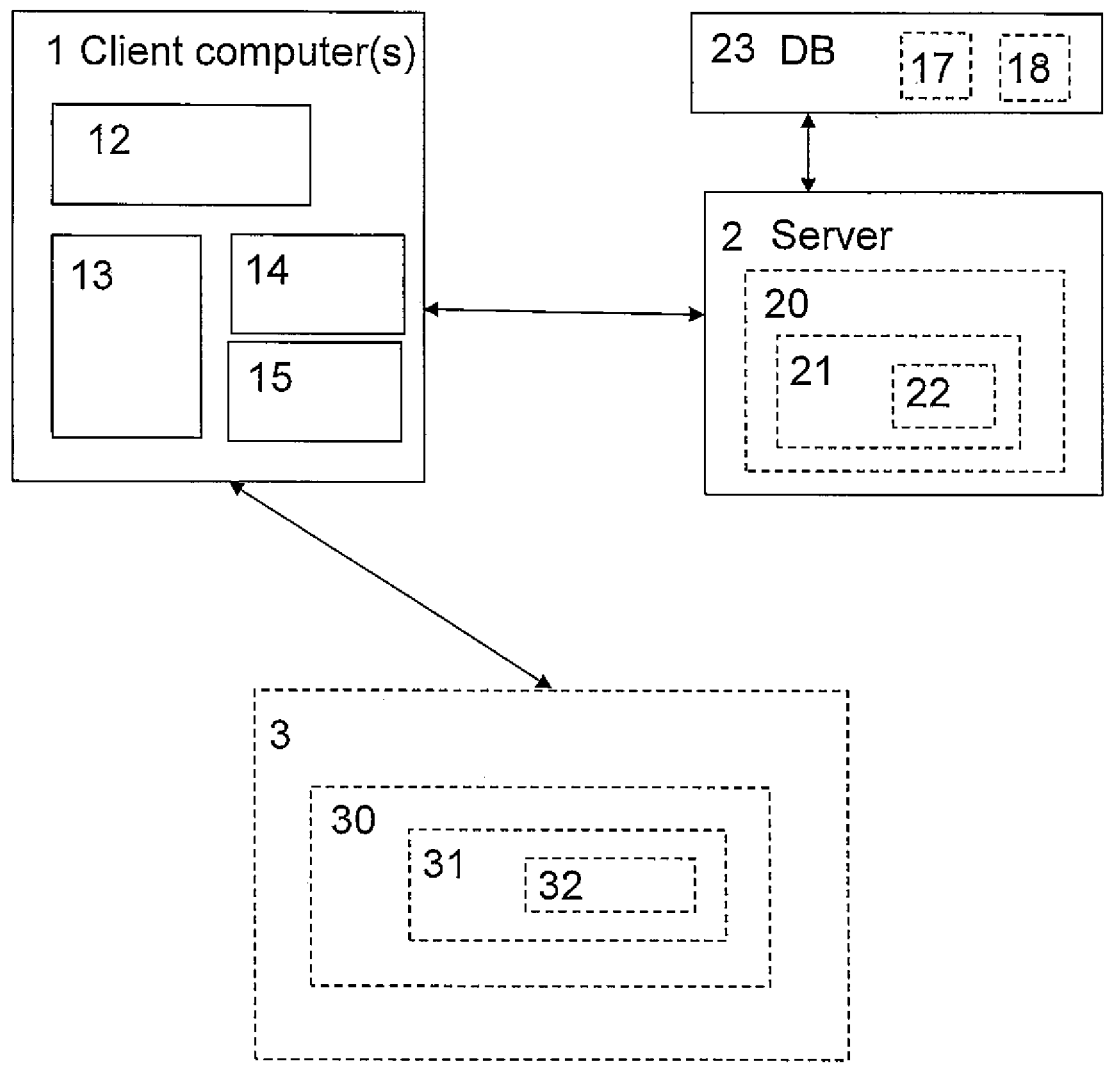
FIG. 1 is a schematic diagram of a system.

An example schematic diagram of a system according to the invention will be described with reference to FIG. 1. A client computer(s) 1 have installed thereon a security application 14 provided by a security service provider. The computer runs a number of further applications, and the security application 14 monitors actions taken by those further applications. The client computer 1 may connect to a server 2, and the security application 14 sends results of the monitoring to the server 2 for analysis, or the analysis may be performed at the client computer 1 by the security application. Data 17 relating to applications or services may be stored in a database 23. For example, event profiles for applications in specific clusters, behaviour profiles/representations of behaviours 18 of applications/clusters may be constructed at the client 1 by the security application 14, at the server 2, and/or at a second server 3 and be stored in a database 23. The client computer 1 and the servers 2 and 3 each typically comprise a hard drive 12, 20, 30, a processor 13, 21, 31, and RAM 15, 22, 32. The client computer 1 may connect to the servers 2 and 3 over the Internet, or any suitable network. The servers 2 and 3 (if used) are operated by the security service provider.

Figure 2:
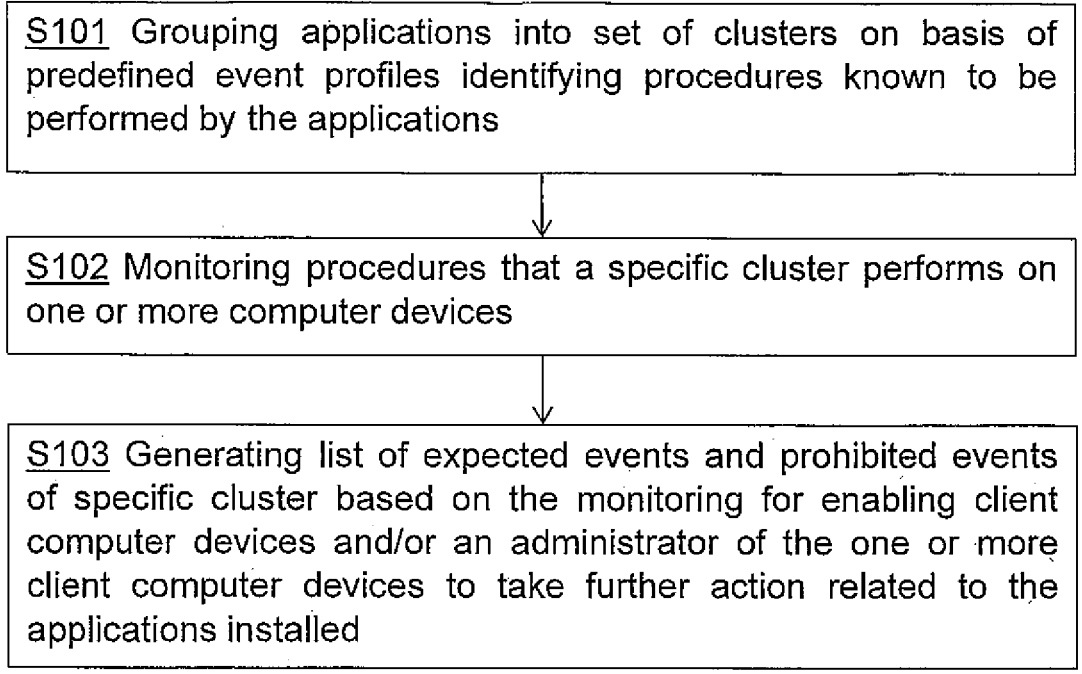
FIG. 2 is a flowchart of application behaviour control method according to an embodiment.

FIG. 2 is a flowchart of a method. The method described herein may take place in a computer device, such as a server backend computer communicating with an endpoint/client device, for example.

In S101, a server backend groups applications into a set of clusters, wherein each application is grouped to a specific cluster on the basis of predefined event profiles for applications in the specific cluster and each event profile identifies one or more procedures known to be performed by the associated application. For each such application, the server may maintain identification information for the application such as filenames, hash data, certificates, etc.

In S102, the server backend further monitors procedures that a specific cluster performs on one or more computer devices.

In S103, the server backend generates a list of expected events and prohibited events of the specific cluster based on monitoring for enabling client computer devices and/or an administrator of the one or more client computer devices to take further action related to the applications installed.

The monitoring is used to detect performance of a characteristic actions of procedures of applications in a specific cluster. A log of results of the monitoring will be stored so that previous monitoring results taken from other client computer devices can be combined and analyzed to generate a list of expected events/actions of the cluster.

The server may maintain the event profiles for applications in the specific cluster in a database. The event profile may identify how the application in a specific cluster implements one or more procedures, for example how an SSL or other secure connection is established, how the application edits registry entries, or any other operation such as file access, network access or memory related operations.

The event profile may identify, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

As a further example, the characteristic action may be the editing of a registry entry. The API used to perform this action will generally be the same regardless of implementation, but there is a detectable difference in the actions preceding the registry edit depending on the programming language in which the code is written, and possibly on the compiler used. The actions may be anything which is done by the application or other software or hardware on the computer system as part of the procedure. The procedures may include file, registry, memory, and/or network operations.

Grouping Applications

Grouping applications into clusters may be performed using multiple methods or a combination thereof. In an embodiment, installation packages are obtained from a vendor site for the grouping. The software vendor site may be automatically crawled to get the installation packages. Thus, the group will include historical updates from the same package.

In another example method of grouping is based on crowdsourcing. It may be assumed that there is a large amount of end point clients performing application inventory. A client computer may scan locally installed applications and collect meta information such as installation directory, vendor names, signer, resource information and content hashes on application files. For example, for Notepad++®, the client may find that the installation root is "%Program Files%\Notepad++", content is notepad++.exe. The backend may then receive and store upstreamed information from the client. The following example table illustrates a crowdsourcing example.

TABLE 1

| Crowdsourcing example of grouping | | |
| --- | --- | --- |
| Client #1 | Client #2 | Backend |
| Notepad.exe | Notepad.exe | Notepad.exe |
| %program Files%\Notepad++ | %program Files%\Notepad++ | %program Files%\Notepad++ |
| sha1:<sha1#1> | sha1:<sha1#2> | sha1:<sha1#2> |
| Registry: HKLM\...\ | Signer: Notepad++ | sha1: <sha1#1> |
| | | Signer: Notepad++ |
| | | Registry: HKLM\...\ |

From the Table 1, it can be seen that two clients upload different meta information of the same application and the backend is capable of creating a superset view representing a generic view of the application.

In an embodiment, fuzz hashing may be utilized for automatically joining multiple versions of the same file. In an embodiment, it is possible to query product description from vendor web site or search product name in Wikipedia in order to group multiple applications under an application category. The description may be passed into text classification, e.g. machine learning text classification, and then applications may be joined into a same cluster if they have been equally classified. Thus, in an example embodiment, application meta is passed to a search engine to receive a product description which in turn is passed into text classification process. For example for "LibreOffice Writer", Wikipedia® may produce the following text description:" LibreOffice Writer is the free and open-source word processor component of the LibreOffice software package and is a fork of OpenOffice.org Writer®. Writer® is a word processor similar to Microsoft Word® and Corel's WordPerfect®, with some identical features." The description text may then be classified as "text processor" and thus, LibreOffice Writer®, Microsoft Word® and Corel's WordPerfect® may be determined to belong to the same cluster.

Application Events

The following list describes examples of procedures related to an event profile:

creating and modifying system files and settings,
installing, updating and removing system components,
modifying other applications,
registering application automatic start launch points,
requesting user elevation (UAC),
creating system files,
creating and modifying user files,
running other processes,
loading of specific modules by application,
receiving data from specific remote host computers,
downloading files,
opening a local server.

It is possible to discover application events from multiple sources, such as executing application in a controlled sandbox, receiving events from crowdsourcing (client upstream) and using static analysis for the application components.

is grouped to a specific cluster on the basis of predefined event profiles. Each event profile identifies one or more procedures known to be performed by the associated application.

In S202, the computer device monitors procedures that a specific cluster performs.

In S203, a list of expected events and prohibited events of the applications in the specific cluster is obtained from the server backend computer.

In S204, the computer devices takes further action related to the applications installed on the one or more client computer devices on the basis of the obtained list. The further action may comprise one or more client computer devices to allow the expected events and to block prohibited events of the applications installed on the one or more client computer devices and/or for enabling an administrator of the one or more client computer devices to manage an application inventory used to control the applications installed on the one or more client computer devices, for example.

Figure 3:
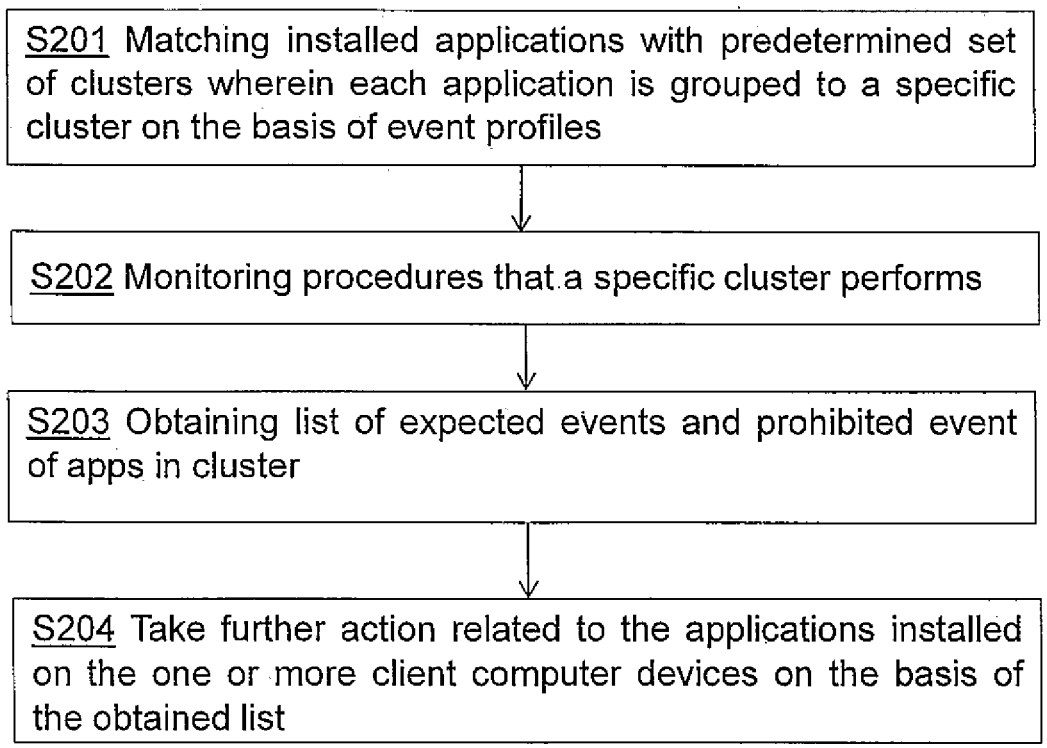
FIG. 3 is another flowchart of application behaviour control method according to an embodiment.
Figure 4:
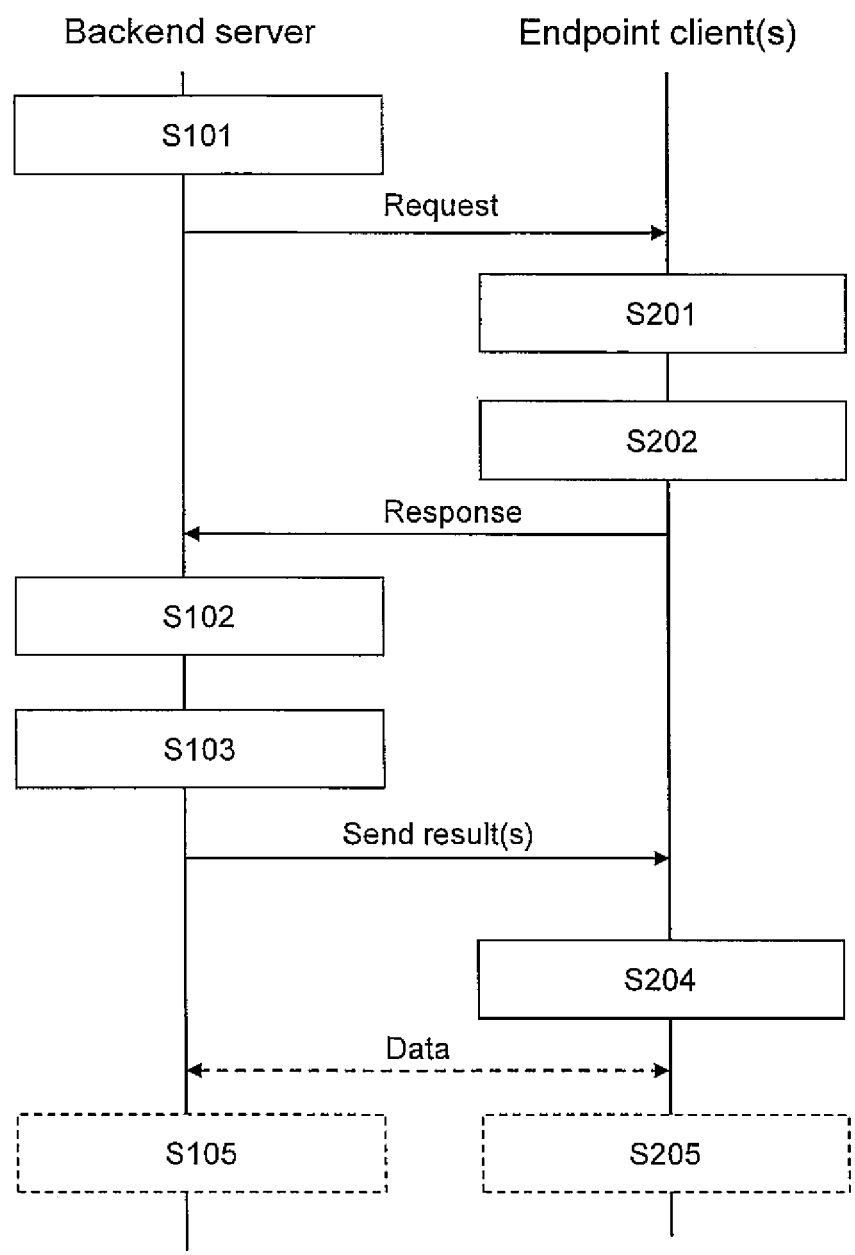
FIG. 4 is a signal sequence diagram that shows another example of the process.

FIG. 4 is a signal sequence diagram that shows one example of the process. The steps S101-S203 and S201-S204 described in relation to FIGS. 2 and 3 are illustrated in the diagram. Backend server and the endpoint clients may continue data exchange continuously or periodically to update the list and the results from the monitoring S105, S205.

In an embodiment, an endpoint application control matches applications against a specific group of applications. In order to perform this matching, several different approaches may be used. In an embodiment, application file hashes, e.g. sha1, are calculated and then the backend is queried to receive information on the specific cluster. Another approach is to query backend with application meta information.

Application control may, for example, send a fuzz hash of the application with the meta information to the backend which also helps to tolerate possible changes in application files. This would help in case application file would have changed, e.g. in result of an update. The purpose of any of the methods used by the application control is to match the applications to the correct clusters and receive expected events list from the backend.

The following example table 2 shows examples of queries and possible responses between an endpoint and a server computer.

TABLE 2

Example queries and responses

| Query and events | Expected events | Never seen events |
| --- | --- | --- |
| User runs installer of an app (e.g. setup.exe of notepad++) Query with sha1 of setup.exe | Creates system files under % program files%\ Modifies registry launch points Requests UAC elevation Runs other processes | Installs drivers and services Modifies user's files Downloads remote files |
| User runs browser Query with Filename: chrome.exe Certificate: "Google Inc" | Downloads remote files Runs other processes Modifies user's files | Creates system files under %program files%\ Modifies registry launch points |

FIG. 3 is another flowchart of application behaviour control method according to an embodiment. The method described herein may take place in a computer device, such as an endpoint/client device communicating with a server backend computer, for example.

In S201, a computer device matches installed applications with predetermined set of clusters, wherein each application The behaviour monitoring may compare results of the monitoring against the expected actions in the list, and identify any actions performed as part of the procedure which are expected and/or never seen. The expected events of the applications may be allowed while the prohibited events may be blocked. Further, any deviation from the expected actions may be used to flag the application as malicious or suspicious, i.e. the application may be compromised (e.g. by injection of malicious code), or the application may be a malicious application pretending to be a legit application.

Deviation from the expected actions may include the presence of additional actions, or the absence of expected actions. In the event that an application is flagged as malicious or suspicious, a further malware scan may be performed on the application. If an application has been identified as malicious or suspicious, further action may be taken to remove or reduce the threat. The type of response will depend on the type of attack. It may be sufficient to terminate the process, or just the procedure, as there may not be any permanent alteration to the application. The application may also be quarantined, deleted or otherwise made safe.

The event profiles may be created on the "back end", i.e. by a security service provider and provided to the security application at the client computer. This profiling may be performed by an automated and/or manual analysis of applications. A set of characteristic actions relating to suitable procedures, performed by applications in a cluster, may be specified and the clusters then analysed to determine characteristic and expected actions. The analysis may also include receiving behavioural monitoring information from each of a plurality of client computers on which the applications belonging to a cluster are running, and determining the characteristic and expected actions from the aggregated results of the behavioural monitoring.

Alternatively, the event profile may at least partly be created at the client computer. In order to create the event profiles, the applications may be run in a sandbox by the security application installed on the client computer, or the behaviour of the application may be monitored during normal use of the computer. In order to mitigate the risks of creating the profile at the client computer, the application may be subject to intensive behavioural analysis techniques while the profile is being created.

As a further alternative, the event profile may be created either at the client computer or the server by examining the binary code of the applications. The code is examined to look for characteristic actions of interest, and to determine which expected actions would be associated with those characteristic actions. The code as stored on disk is analysed, rather than the code in memory when the program is being executed, in order to exclude code that could be added to the execution of the application by a code injection attack.

The monitoring of the procedures that a specific cluster performs may be performed by a stand-alone software module of the security application which hooks into various behaviours of the applications, or by a plugin, installed into the applications, by the security application: a combination of both approaches may also be used. The monitoring may comprise kernel-mode and/or user-mode hooks, and/or hooking other calls to or from the application such as Browser Helper Objects or parts of the application API which provide information to other applications, e.g. plugins. The monitoring may include monitoring API calls made by the application and/or information available through the application's own API.

The monitoring of procedures that a specific cluster performs and detection of expected actions may be performed at the client computer. Alternatively, the client computer may monitor the procedures, and send details of monitored actions to a server, along with identification information for the monitored applications/cluster. The information may be sent periodically, or only when specific actions are detected. The server maintains a database of event profile of one or more specific clusters and the lists of expected events and prohibited events thereof.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of application behaviour control performed on a computer system or server, the method comprising:
   a) grouping applications into a set of clusters, wherein each cluster represents any application associated with a respective cluster and wherein each application is grouped to a specific cluster on the basis of predefined event profiles for an application associated with the specific cluster, each event profile identifying one or more procedures known to be performed by an application associated the specific cluster;
   b) monitoring procedures that an application associated with a specific cluster performs on one or more computer devices; and
   c) generating a list of expected events and prohibited events for an application associated with the specific cluster based on said monitoring to enable taking at one or more client computer devices further action related to applications installed on the one or more client computer devices, wherein said further action comprises at least one of: one of allowing or prohibiting an event based on said list, or managing an application inventory used to control the applications installed on said one or more client computer devices based on said list.

2. A method according to claim 1, wherein a group of applications in a cluster includes multiple versions of the same application and/or separate applications having similar event profiles.

3. A method according to claim 1, wherein the step of grouping applications into the set of clusters comprises one or more of: obtaining installation packages from a vendor, crowdsourcing meta data of application files from the one or more client computer devices, querying product descriptions of the applications and using text classification.

4. A method according to claim 1, wherein the procedures related to an event profile comprise one or more of:
   creating and modifying system files and settings;
   installing, updating and removing system components;
   modifying other applications;
   registering application automatic start launch points;
   requesting user elevation;
   creating system files;
   creating and modifying user files;
   running other processes;
   loading of specific modules;
   receiving data from specific remote host computers;
   downloading files;
   opening a local server.

5. A method according to claim 1, further comprising discovering procedures of an application by one or more of:

executing the application in a controlled sandbox, receiving events from crowdsourcing, static analysing of the application components.

6. A method according to claim 1, the method further comprising providing the generated list of expected events and prohibited events of the specific cluster to one or more client computer devices and/or the administrator for enabling the one or more client computer devices to allow the expected events and to block prohibited events of the applications installed on the one or more client computer devices and/or for enabling an administrator of the one or more client computer devices to manage an application inventory used to control the applications installed on the one or more client computer devices.

7. A method according to claim 1, wherein said procedures include any one or more of:
   establishment of a secure session;
   communication over a secure session;
   file operations;
   registry operations;
   memory operations;
   network operations.

8. A method according to claim 1, wherein the expected and/or prohibited events include one or more of:
   API calls made by a running application;
   information made available to plugins of the running application;
   actions relating to Browser Helper Objects;
   file access operations performed by the miming application;
   network operations performed by the running application;
   encrypted communications sent by the running application.

9. A method according to claim 1, the method further comprises generating
   the event profile for the applications in the specific cluster by one or more of:
   monitoring the behaviour of the application running on a plurality of client computer devices and identifying procedures and respective characteristic and expected actions from the aggregate results; and
   performing a static analysis of binary code associated with the application.

10. A method of application behaviour control on a computer system, the method comprising:
   a) matching installed applications with predetermined set of clusters, wherein each cluster represents any application associated with a respective cluster, and wherein each application is grouped to a specific cluster on the basis of predefined event profiles, each event profile identifying one or more procedures known to be performed by an application associated with the specific cluster;
   b) monitoring procedures that an application associated with a specific cluster performs;
   c) obtaining a list of expected events and prohibited events for an application associated with the specific cluster; and
   d) taking further action related to applications installed on one or more client computer devices on the basis of the obtained list, wherein said further action comprises at least one of: allowing or prohibiting an event based on said list, or managing an application inventory used to control the applications installed on said one or more client computer devices based on said list.

11. A method according to claim 10, wherein a group of applications in a cluster includes multiple versions of the same application and/or separate applications having similar event profiles.

12. A method according to claim 10, wherein the procedures related to an event profile comprise one or more of:
   creating and modifying system files and settings;
   installing, updating and removing system components;
   modifying other applications;
   registering application automatic start launch points;
   requesting user elevation;
   creating system files;
   creating and modifying user files;
   running other processes;
   loading of specific modules;
   receiving data from specific remote host computers;
   downloading files;
   opening a local server.

13. A method according to claim 10, wherein said procedures include any one or more of:
   establishment of a secure session;
   communication over a secure session;
   file operations;
   registry operations;
   memory operations;
   network operations.

14. A method according to claim 10, wherein the expected and/or prohibited events include one or more of:
   system files created under program files;
   registry launch points modified;
   UAC elevation requests;
   downloading remote files;
   running other processes;
   modifying user files;
   installing drivers and services;
   API calls made by a running application;
   information made available to plugins of the running application;
   actions relating to Browser Helper Objects;
   file access operations performed by the running application;
   network operations performed by the running application;
   encrypted communications sent by the running application.

15. A method according to claim 10, wherein in addition to blocking prohibited events, the method further comprises handling a running application by one or more of: terminating a process of the running application; terminating a characteristic action of the running application or an action resulting from the characteristic action; removing or otherwise making safe the running application; and performing a further malware scan on the application.

16. A method according to claim 10, wherein taking the further action comprises: allowing the expected events and blocking prohibited events of the applications installed on the one or more client computer devices and/or managing an application inventory used to control the applications installed on the one or more client computer devices.

17. A method according to claim 10, wherein the step of matching installed applications with predetermined set of clusters further comprises: computing application file hashes and querying backend server computer for the cluster data.

18. A method according to claim 10, wherein the step of matching installed applications with predetermined set of clusters further comprises: querying backend server computer with meta data and/or fuzz hash of the application.

19. A computer system comprising:
a processor configured to:
 a) match installed applications with predetermined set of clusters, wherein each cluster represents any application associated with a respective cluster, and wherein each application is grouped to a specific cluster on the basis of predefined event profiles, each event profile identifying one or more procedures known to be performed by an application associated with the specific cluster;
 b) monitor procedures that an application associated with a specific cluster performs;
 c) obtain a list of expected events and prohibited events of for an application associated with a specific cluster; and
 d) take further action related to the applications installed on the one or more client computer devices on the basis of the obtained list, wherein said further action comprises at least one of: one of allowing or prohibiting an event based on said list, or managing an application inventory used to control the applications installed on said one or more client computer devices based on said list.

20. A server comprising:
a memory configured to store respective event profiles for a set of clusters, each cluster representing any application associated with a respective cluster and each event profile identifying one or more procedures known to be performed by the an application associated application with the respective cluster;
a processor configured to:
 a) group applications into the set of clusters, wherein each application is grouped to a specific cluster on the basis of the predefined event profiles for an application associated with the specific cluster;
 b) monitor procedures that an application associated with a specific cluster performs on one or more computer devices; and
 c) generate a list of expected events and prohibited events for an application associated with the specific cluster based on said monitoring to enable taking at one or more client computer devices further action related to applications installed on the one or more client computer devices, wherein said further action comprises at least one of: one of allowing or prohibiting an event based on said list, or managing an application inventory used to control the applications installed on said one or more client computer devices based on said list.

21. The server according to claim 20, the processor being further configured to send the generated list of expected events and prohibited events of the specific cluster to one or more client computer devices.

* * * * *